Jan. 22, 1935.  E. A. ECKHOUSE  1,988,966

FAUCET VALVE MEANS

Filed Jan. 6, 1934

INVENTOR
EDGAR A. ECKHOUSE
BY
Brockett, Hyde, Higley & Meyer
ATTORNEYS

Patented Jan. 22, 1935

1,988,966

UNITED STATES PATENT OFFICE 1,988,966

FAUCET VALVE MEANS

Edgar A. Eckhouse, Cleveland Heights, Ohio

Application January 6, 1934, Serial No. 705,532

7 Claims. (Cl. 251—167)

This invention relates to valve means of the type designed for employment in plumbing appliances such as the ordinary domestic or industrial faucet. As will appear, the invention is adapted to arrangements wherein all of the working parts are removable from the stationary connected parts, so that the working parts are easily inspected and may be replaced as might be necessary.

An object of the invention is to improve the valve seat, at which the most wear occurs and which is consequently the source of most trouble; and more particularly for the purpose the invention includes employment of a metallic seat gasket in a novel arrangement, thereby eliminating the usual rubber seat washer requiring frequent replacement, especially when the faucet is installed in a hot water line. The gasket employed according to this invention, as will appear, is preferably of metal having some ductility, and adapted to be worked somewhat by the seating of the valve. An important part of this invention is to provide that such working of the valve seat gasket shall in nowise prevent or affect disassembly of the working parts from the stationary parts of the faucet.

Another object is to provide means for limiting the opening motion of the valve without limiting flow therepast.

Figure 1:
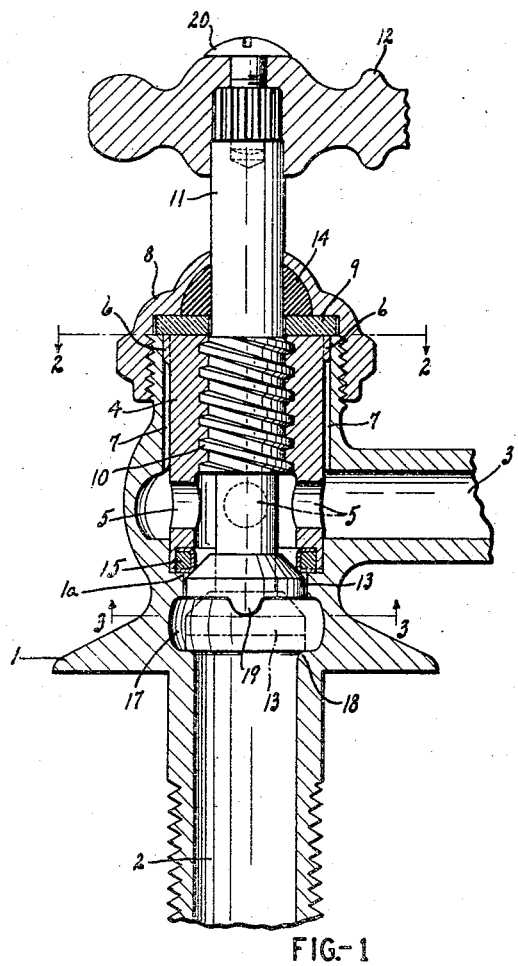
Figure 2:
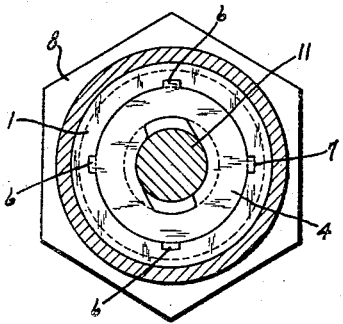
Figure 3:
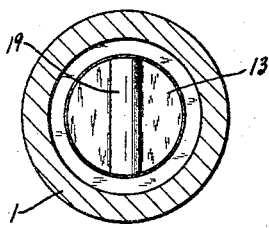
Figure 6:
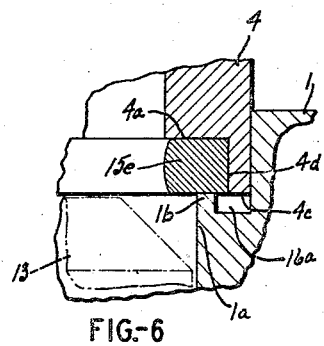
Figure 4:
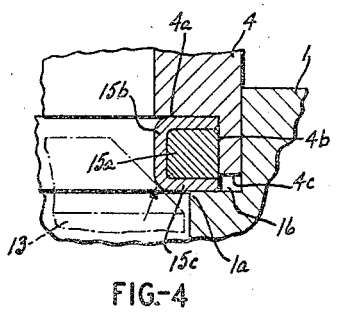
Figure 5:
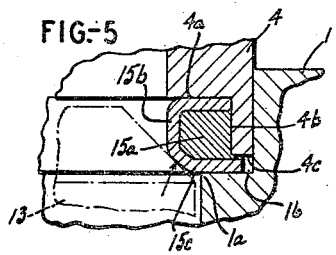

The exact nature of this invention together with further objects and advantages thereof will be apparent from the following description taken in connection with the accompanying drawing, in which Fig. 1 is an enlarged sectional view of an ordinary lavatory faucet in which the invention is embodied, showing the parts in closed position, and in dot-dash lines indicating the open position of the valve; Figs. 2 and 3 are transverse sections of the same as in the planes of lines 2—2, and 3—3, respectively, Fig. 1; Figs. 4 and 5 are enlarged details of the valve seat parts appearing in Fig. 1, Fig. 4 showing the valve seat as when new and Fig. 5 as after exaggeratedly extensive use, and both figures showing the valve in seated position in dot-dash lines; and Fig. 6 is a view similar to Fig. 4 but showing a modified form of gasket and mounting thereof, and the valve in partially open position.

With reference now to the drawing, 1 represents generally the body part of the faucet, having inlet and outlet passages 2 and 3 respectively, and chambered as indicated to permit communication between inlet and outlet and for further purposes to be described. In a faucet such as here indicated, the valve body is threaded at the inlet passage to provide for its plumbing connection with the source of water or the like, and its outlet passage is continued in the form of a nozzle all as will be readily appreciated.

A chambered insert sleeve or plug 4 is removably mounted in the body 1 to carry the faucet valve. It is provided with an end inlet opening toward which the inlet passage 2 of the body is directed, and a plurality of lateral outlet openings 5 providing egress to the body outlet passage 3. The sleeve 4 is provided with means permitting it longitudinal inserting motion but preventing its rotation in the valve body, such as the projections 6 engaging slots 7. It is removably secured as by a cap 8 threaded onto the body 1 as indicated, a non-metallic washer 9 being arranged to be effective between the cap 8 and the body 1 to prevent leakage at the cap. Mounted in the sleeve 4 is the valve, having threaded relation with the plug as indicated at 10, having a stem part 11 extending beyond the body 1 to receive the usual handle 12, and extending in the opposite direction beyond the sleeve and there headed as at 13 to form the valve proper. A packing 14 is provided about the stem 11 to prevent leakage at that location.

Annular gasket means generally indicated at 15, Fig. 1, are provided at the end of the sleeve 4 to form a seat for the valve 13, and also an inner seat for the sleeve against which the latter may be forced by the cap 8; and it will be readily apparent, first that the inlet and outlet openings of the sleeve 4 being in series relation with those of the faucet body 1, the valve 13 will control flow through the faucet, and secondly, that the valve together with the plug which carries its seat, may be removed from the faucet body 1 as a unit simply by unscrewing of the cap 8.

What has thus far been described will be recognized as characteristic of, rather than novel over, the prior art.

According to this invention, the valve end of the sleeve 4, is recessed to receive the major part of the gasket 15, having a flat face 4a against which the gasket seats longitudinally, a flange part with a cylindrical face 4b against which the gasket may seat at its outer periphery, and terminating at 4c short of the thickness of the gasket, to provide an annular clearance 16. The faucet body 1 is provided with a shoulder as at 1a to form a seat for the gasket 15 yet clear the valve 13, and permit the gasket to extend inwardly beyond the shoulder 1a to provide a shoulder against which the valve 13 may seat. As already stated, the parts are so proportioned and arranged that tightening of the cap 8 upon the body 1 effects tightening of the sleeve 4 against the gasket 15 and of the latter against the body 1 at the shoulder 1a, so that the gasket is endwise clamped to provide a seal between sleeve and body 1 at the inlet of the former.

The gasket 15 here illustrated comprises a core 15a and a facing therefor having a part 15b at the inner periphery of the core 15a and a part 15c on that face of the core 15a presented toward the shoulder 1a of the faucet body. The facing 15b may be extended as shown over the opposite flat face of the core 15a to bear upon the entire face 4a of the sleeve 4, to maintain the assembly of the facing upon the core 15a. It is important here only that the facing be self-maintaining upon the core, and that the facing extend sufficiently, first to provide a substantial bearing area effective between the core 15a and the valve 13 at the projecting shoulder of the gasket against which the valve seats, and secondly that the facing be effective between the core and the shoulder 1a of the body 1, as at 15c. Also it is to be noted that the clearance 16 beneath the end 4c of the sleeve is preferably of greater longitudinal extent than the facing at 15c.

The gasket core 15a is of yieldable characteristic and is preferably of ductile metal such as an alloy of lead. The facing for the core is of metal such as a copper alloy, somewhat ductile but both harder than the core 15a and softer than the valve 13. Of course the exact materials depend upon the fluid to be controlled and the operating temperatures. In the case of an ordinary faucet valve where water is to be controlled, we have found that regardless of temperature a suitable gasket has a lead core and copper facing, the valve being of brass and the other principal parts of the faucet being as usual of non-ferrous metal.

It will be observed that the effective seating pressure of the valve against the gasket will be, as indicated by the arrow, Fig. 4, such as will tend to seat the gasket both endwise and peripherally in the recess of the sleeve 4.

Thus, with reference now to Fig. 5, although repeated seating of the valve will cause the gasket parts to be worked somewhat, causing the core part 15a of the gasket to expand, the annular face 4b of the sleeve 4 will prevent the gasket from gripping the faucet body; so that the sleeve, with the gasket, will be easily removable from the faucet body. As the core part of the gasket thus yields, so will its facing somewhat yield also, conforming itself to the valve 13 to provide a perfect yet long-lived seat for the latter. In extreme cases, as exaggeratedly shown in Fig. 5, the gasket facing part 15c might even be worked sufficiently to extend into the clearance 16, any such yielding of the facing of course being accompanied by enlargement of the effective gasket area against which the valve seats, as indicated. Obviously such described working of the gasket will be actually decidedly limited.

Fig. 6 shows a construction at the gasket, modified in two respects. The gasket is here shown as without a separate facing material, instead comprising a single integral piece of material of suitable characteristics. Lead has been successfully used for the purpose, although this invention is not limited to the employement of metal as the gasket material.

The sleeve 4 is recessed to enclose the gasket generally as in the arrangements of Figs. 4 and 5, except that here the gasket-retaining flange part 4d of the sleeve 4 may extend flush with the face of the gasket so that the latter does not extend beyond the sleeve extremity and the entire area of its peripheral face lies within its sleeve recess.

To permit and insure that the gasket shall provide a seal between the sleeve and the faucet body under these conditions, the faucet body is provided with an annular recess 16a to clear the part 4d of the sleeve 4, leaving an annular projection 1b against which the gasket 15e seats. Obviously by this arrangement the two flat faces of the gasket seat respectively against the flat faces 4a of the sleeve and the projection 1b of the faucet body. The radial dimension of the clearance 16a is greater than that of the part 4d of the sleeve as indicated, so that the described seating of the gasket 15e will be effectively maintained regardless of deformation which may result to the gasket by seating of the valve 13.

Obviously the gasket of Figs. 4 and 5 might be employed in place of the gasket of Fig. 6, and vice versa.

Improved means are provided for limiting the opening motion of the valve. With reference to Fig. 1, the body 1 is provided with a cavity 17 into which the valve moves in opening, having an annular shoulder 18 at the entrance of the cavity 17, opposite the sleeve 4, and into which the inlet passage 2 of the body 1 delivers. The shoulder 18 is of lesser diameter than the valve 13 so that it might limit opening movement of the valve but by doing so would effectively cut off flow. To avoid this the near face of the valve 13 is provided with a deformation, here shown in the form of a diametrically extending lug 19, obviously engageable with the shoulder 18 to limit opening motion of the valve yet substantially without obstruction to flow therepast.

The annular arrangement of cavity 17 and shoulder 18 offers not the slightest difficulty to molder or foundryman, nor does the simple form of lug 19.

What I claim is:

1. In a faucet, a chambered body having inlet and outlet passages, an insert sleeve removably mounted in said body opposite its said inlet passage, with inlet and outlet openings in series relation with those of the body, an annular gasket mounted in said sleeve at the inlet opening thereof, with an annular part arranged to seal the sleeve against the body, and a valve mounted in said sleeve, having a head arranged to seat upon said gasket to control the sleeve inlet, and having a stem extending beyond said body to receive a handle, said sleeve being recessed to receive said gasket and provide a cylindrical retaining flange thereabout, and said body having an annular shoulder about said inlet passage and providing a seating face for the corresponding gasket face, whereby radial expansion of said gasket under seating pressure of said valve will be limited by said retaining flange, and said gasket will be freely removable with said sleeve from said faucet body.

2. In a faucet, a chambered body having inlet and outlet passages, an insert sleeve removably mounted in said body opposite its said inlet passage, with inlet and outlet openings in series relation with those of the body, an annular gasket of ductile metal mounted in said sleeve at the inlet opening thereof, with an annular part arranged to seal the sleeve against the body, and a valve mounted in said sleeve, having a head arranged to seat upon said gasket to control the sleeve inlet, and having a stem extending beyond said body to receive a handle, said sleeve being recessed to receive said gasket and provide a cylindrical retaining flange thereabout, and said body having an annular shoulder about said inlet passage and providing a seating face for the corresponding gasket face, whereby radial expansion of said gasket under seating pressure of said valve will be limited by said retaining flange, and said gasket will be freely removable with said sleeve from said faucet body.

3. In a faucet, a chambered body having inlet and outlet passages, an insert sleeve removably mounted in said body opposite its said inlet passage, with inlet and outlet openings in series relation with those of the body, an annular gasket mounted in said sleeve at the inlet opening thereof, with an annular part arranged to seal the sleeve against the body, and a valve mounted in said sleeve, having a head arranged to seat upon said gasket to control the sleeve inlet, and having a stem extending beyond said body to receive a handle, said sleeve being recessed to receive said gasket and provide a cylindrical retaining flange thereabout, and said body having an annular shoulder about said inlet passage and providing a seating face for the corresponding gasket face, whereby radial expansion of said gasket under seating pressure of said valve will be limited by said retaining flange, and said gasket will be freely removable with said sleeve from said faucet body, said gasket being of thickness to extend from said recess beyond said retaining flange whereby the latter has clearance from said shoulder permitting said gasket to seat on the latter.

4. In a faucet, a chambered body having inlet and outlet passages, an insert sleeve removably mounted in said body opposite its said inlet passage, with inlet and outlet openings in series relation with those of the body, an annular gasket mounted in said sleeve at the inlet opening thereof, with an annular part arranged to seal the sleeve against the body, and a valve mounted in said sleeve, having a head arranged to seat upon said gasket to control the sleeve inlet, and having a stem extending beyond said body to receive a handle, said sleeve being recessed to receive said gasket and provide a cylindrical retaining flange thereabout, and said body having an annular shoulder about said inlet passage and providing a seating face for the corresponding gasket face, whereby radial expansion of said gasket under seating pressure of said valve will be limited by said retaining flange, and said gasket will be freely removable from said faucet body, with said sleeve, said body shoulder having an annular groove opposite said retaining flange to provide clearance for the latter permitting said gasket to be wholly surrounded peripherally by said retaining flange yet insuring a seal between said gasket and said shoulder.

5. In a faucet, a chambered body having inlet and outlet passages, an insert sleeve removably mounted in said body opposite its said inlet passage, with inlet and outlet openings in series relation with those of the body, an annular gasket mounted in said sleeve at the inlet opening thereof, with an outer annular part arranged to seal the sleeve against the body, and a valve threadedly mounted in said sleeve, having a head arranged to seat upon said gasket to control the sleeve inlet, and having a stem extending beyond said body to receive a handle, said sleeve being recessed to receive the major portion of said gasket and said body having an annular shoulder about said inlet passage and providing a seating face for said annular part of the gasket face, whereby said gasket is confined peripherally and at both faces, with an inner annular part extending as a shoulder inwardly of said body shoulder, said valve being of conical type adapted to seat against said gasket shoulder part with radially outward effective pressure against the peripheral wall of said sleeve recess, said gasket having a yieldable core adapted to assume under said pressure and to retain thereafter a grip upon said peripheral sleeve recess wall, and said gasket shoulder part being faced with metal softer than said valve and harder than said core.

6. In a faucet, a chambered body having inlet and outlet passages, an insert sleeve removably mounted in said body opposite its said inlet passage, with inlet and outlet openings in series relation with those of the body, an annular gasket mounted in said sleeve at the inlet opening thereof, with an outer annular part arranged to seal the sleeve against the body, and a valve threadedly mounted in said sleeve, having a head arranged to seat upon said gasket to control the sleeve inlet, and having a stem extending beyond said body to receive a handle, said sleeve being recessed to receive the major portion of said gasket and said body having an annular shoulder about said inlet passage and providing a seating face for said annular part of the gasket face, whereby said gasket is confined peripherally and at both faces, with an inner annular part extending as a shoulder inwardly of said body shoulder, said valve being of conical type adapted to seat against said gasket shoulder part with radially outward effective pressure against the peripheral wall of said sleeve recess.

7. In a faucet, a chambered body having inlet and outlet passages, an insert sleeve removably mounted in said body opposite its said inlet passage, with inlet and outlet openings in series relation with those of the body, an annular gasket mounted in said sleeve at the inlet opening thereof, with an outer annular part arranged to seal the sleeve against the body, and a valve threadedly mounted in said sleeve, having a head arranged to seat upon said gasket to control the sleeve inlet, and having a stem extending beyond said body to receive a handle, said sleeve being recessed to receive the major portion of said gasket and said body having an annular shoulder about said inlet passage and providing a seating face for said annular part of the gasket face, whereby said gasket is confined peripherally and at both faces, with an inner annular part extending as a shoulder inwardly of said body shoulder, said valve being of conical type adapted to seat against said gasket shoulder part with radially outward effective pressure against the peripheral wall of said sleeve recess, said gasket having a ductile core, faced at said gasket shoulder part with harder metal, said facing extending over the inner periphery of the core and over the core face presented away from said sleeve, and said gasket being of thickness to space said sleeve from said faucet body shoulder sufficiently to permit said facing to be expanded outwardly over said gasket core by said valve, toward said faucet body.

EDGAR A. ECKHOUSE.